United States Patent [19]

Budahn et al.

[11] Patent Number: 4,495,306

[45] Date of Patent: Jan. 22, 1985

[54] PREPARATION OF CATALYSTS BY THE PRECIPITATION OF A HYDROXIDE OR SULFIDE FROM AN EMULSION IN THE PRESENCE OF CARBONACEOUS SOLID

[75] Inventors: Peter Budahn, Ellerhoop; Jörn Ehlers, Uetersen, both of Fed. Rep. of Germany

[73] Assignee: The British Petroleum Company Limited, London, England

[21] Appl. No.: 582,884

[22] Filed: Feb. 23, 1984

Related U.S. Application Data

[63] Continuation of Ser. No. 364,177, Apr. 1, 1982, abandoned.

[30] Foreign Application Priority Data

Apr. 8, 1981 [DE] Fed. Rep. of Germany ....... 3114168

[51] Int. Cl.³ .................. B01J 23/82; B01J 23/74; C10G 1/06; C10G 47/12
[52] U.S. Cl. ..................... 502/185; 208/10; 208/112; 502/150; 502/182; 502/183
[58] Field of Search .......... 208/10, 112, 145; 502/182–185, 150

[56] References Cited

U.S. PATENT DOCUMENTS

| 1,084,258 | 1/1914 | Ellis | 502/185 |
|---|---|---|---|
| 1,470,552 | 10/1923 | Byers | 502/185 |
| 1,744,735 | 1/1930 | Berl | 502/416 |
| 2,320,063 | 5/1943 | Borkowski et al. | 502/173 |
| 3,637,529 | 1/1972 | Van Beek et al. | 502/300 |
| 4,136,013 | 1/1979 | Moll et al. | 208/10 |
| 4,244,839 | 1/1981 | Aldridge et al. | 502/305 |
| 4,313,852 | 2/1982 | Gavin et al. | 502/182 |
| 4,374,100 | 2/1983 | Sebenik et al. | 208/10 |

FOREIGN PATENT DOCUMENTS

| 2808561 | 8/1978 | Fed. Rep. of Germany . | |
| 1374237 | 11/1974 | United Kingdom . | |
| 2056478 | 3/1981 | United Kingdom | 502/182 |

*Primary Examiner*—P. E. Konopka
*Attorney, Agent, or Firm*—Morgan, Finnegan, Pine, Foley & Lee

[57] ABSTRACT

A process for the preparation of hydrogenation catalysts by contacting a carbonaceous material with a water in oil emulsion containing a salt of a hydrogenating metal, converting said salt to a hydroxide or sulfide and subsequently removing the water.

10 Claims, 2 Drawing Figures

PREPARATION OF CATALYSTS BY THE PRECIPITATION OF A HYDROXIDE OR SULFIDE FROM AN EMULSION IN THE PRESENCE OF CARBONACEOUS SOLID

This is a continuation of application Ser. No. 364,177 filed Apr. 1, 1982 now abandoned.

This invention relates to a process for the production of particles of a solid carbonaceous material, particularly coal, in admixture with a hydrogenation catalyst.

The material may be used as a supported hydrogenation catalyst or, particularly when coal is employed, as a self-catalysed feedstock for hydrogenation.

A process for the liquid phase hydrogenation of coal was developed by I. G. Farbenindustrie A.G. (IG) and used on a large industrial scale until 1945. In 1973 interest revived and the process was developed further. The new LG process resulting from this development operates like the old IG process with a cheap iron catalyst.

To make the catalyst, ferric oxide (Bayermasse 2% by weight based on moisture and ash-free coal) is ground together with coal in a ball mill.

An aqueous solution of ferrous sulphate (1% by weight based on moisture and ash-free coal) is then sprayed onto the finely ground coal. The distribution of the catalyst onto the coal is poor so that relatively large quantities of catalyst have to be used to achieve a high conversion rate of coal into liquid products.

Earlier work in the field of coal liquefaction has shown that the degree of conversion (transforming the coal into liquid and gaseous products) depends on various parameters such as temperature, hydrogen partial pressure, presence and nature of a 'hydrogen donor solvent' and presence and nature of a catalyst.

A comprehensive examination of the influence of the various parameters is described by Charles O. Hawk, "Hydrogenation of Coal in the Batch Autoclave", Washington I, U.S. Dept. of Mines, 1965. According to this, the activity of a catalyst depends not only on its nature, but also on its distribution. A survey is then made of the various methods for applying a catalyst onto coal, cf Charles O. Hawk, loc.cit., page 5 et seqq.

1. Impregnation

This process distributes the catalyst uniformly over the coal. Finely ground coal is stirred with an aqueous solution of the catalyst to form a suspension. The water is then evaporated and the catalyst is dispersed in finely divided form on the coal. The energy costs for evaporating the water, however, are too high for use on a large industrial scale.

By using polar organic solvents, the energy outlay could be lowered to match the lower evaporation enhalpies. However, ferric chloride is the only inorganic iron salt which is sufficiently soluble in organic solvents. Unfortunately, chloride ions tend to deactivate iron catalysts and also tend to be corrosive. Therefore this approach has not been successful. A similar situation exists in respect of other catalytic metals.

2. Blending in a Ball Mill

In this process the catalyst is finely ground together with preground coal in a ball mill. Even after a long residence time, the dispersal of the catalyst over the coal is worse than that achieved by impregnation. A similar process was used on a large industrial scale in the above-mentioned IG Farben process.

3. Blending in a Tumble Mixer

Only blending occurs in a tumble mixer when finely ground catalyst is added to finely ground coal. This method has been used for mixing in iron oxide (Bayermasse, Luxmasse, bog iron ore) in the IG Farben process. The catalyst distribution is the worst of all the processes mentioned here.

4. Melting Process

Ferrous sulphate heptahydrate is added to the finely ground coal prior to drying. During the subsequent heating and drying the salt melts in its own water of crystallisation and precipitates onto the coal during the evaporation of the water.

5. Spray Process

This process has already been mentioned. The distribution is better than with the melting process, but distinctly worse than the impregnation process.

6. Oil-Soluble Catalysts

Better distribution can be achieved by using a coal-/oil suspension and an oil-soluble catalyst. When heating up to hydrogenation conditions (400°–500° C.) the oil-soluble compound is decomposed and the catalyst is deposited in finely divided form on the coal. Metallic salts of unsaturated fatty acids, sulphonic acids, naphthenic acid and phenols are mostly used in this way. The high price of these compounds, does not permit their use on a large industrial scale.

7. Application of Emulsions

In the so-called emulsion process, an aqueous catalyst solution is emulsified with the slurry oil or the coal/oil suspension. When heated up to hydrogenation the emulsion is decomposed and the catalyst precipitates onto the coal. In the process described in DE-OS No. 2 808 561, ammonium molybdate and ferrous sulphate heptahydrate are used to form the catalyst. Depending on the solubility of the salt, up to 30% of water, based on the coal, is required to form the emulsion. The high water content leads to a correspondingly marked drop in the hydrogen partial pressure under coal hydrogenation conditions. Moreover, this process makes high demands on the quality of the emulsion; only with very finely dispersed emulsions is sufficiently good distribution of catalyst achieved.

According to the present invention, there is provided a process for the production of a mixture of a solid carbonaceous material in particulate form and a hydrogenation catalyst which process comprises the steps of contacting particles of the carbonaceous material with an aqueous solution of a salt of a hydrogenating metal, converting the salt to a sparingly soluble derivative, and subsequently removing the water.

The preferred carbonaceous material are hard coals, particularly bituminous coal.

Such materials may be used to catalyse their own hydrogenation and/or the hydrogenation of other products.

Other products which can be hydrogenated alone or together with coal include heavy fractions derived from the hydrogenation of coal, particularly, those boiling in the range 260° C. to 550° C., heavy fractions and residues derived from crude oil, heavy crude oil, tar sand oil, coal tar fractions and pitches.

Different types of coke may also be used as the carbonaceous material. However, these act mainly as supports for the finely divided catalyst and are substantially unconverted during hydrogenation reactions.

Preferably the sparingly soluble derivative to which the salt is converted is a hydroxide or sulphide.

The precipitation of the catalytic metal as the hydroxide may be effected by the addition of alkali which is restricted in quantity to the volume necessary to cause the metal to precipitate. If hydrogen sulphide is passed in at the same time, the metal is usually deposited as the sulphide. The metal hydroxide or sulphide precipitates out in a finely divided form which is colloidal and is adsorbed by the carbonaceous material.

Surprisingly it has been found that substantially complete adsorption of the finely dispersed catalyst onto the material takes place, so that on filtering no metal compounds are present in the aqueous filtrate, or only the quantities corresponding to the solubility product. Filtration is not essential to remove the water, however, this can be done by a hydrocyclone.

If coal with a high sulphur content is used, it is sufficient to precipitate the catalyst as hydroxide only. This reacts under coal hydrogenation conditions with sulphur compounds present in the coal, so that a highly active metallic sulphide is produced in situ. As a result of this, as a further advantage, sulphur is chemically combined.

With coal having a low sulphur content, on the other hand, it is preferable to precipitate in the presence of hydrogen sulphide.

The hydrogenating activity of the mixture of carbonaceous material and hydrogenation catalyst can be improved by grinding the mixture, for example, in a ball mill.

According to a preferred feature of the invention, for carbonaceous material is suspended in the aqueous solution containing the metal salt. In order to keep the water content of the mixture as low as possible, the metallic salt solution should be highly concentrated.

The ratio of the quantity of aqueous catalyst solution to the carbonaceous material suitably lies in the range from 0.1:1 to 2.0:1, preferably in the range from 0.3:1 to 0.7:1.

According to a further feature of the invention, the metallic salt may be dissolved in the aqueous phase of a water-in-oil emulsion. In this way a system is obtained which comprises particulate suspended carbonaceous material, metallic salt solution and oil.

After adjusting the pH of the aqueous phase, hydrogen sulphide is added and metallic sulphide in colloidal form is precipitated and adsorbed by the material. When the hydrogen sulphide is added, or at the latest during the heating of the emulsion/suspension system, the emulsion is broken. The water is then eliminated, for example by means of a hydrocyclone or preferably, as shown in FIG. 2 of the accompanying drawings, by heating in a preliminary stage of the conversion plant.

As the metallic sulphide is precipitated from the emulsion in colloidal form, it is not necessary, as with the process disclosed by DE-OS No. 28 08 561, to produce a finely dispersed emulsion, a coarsely dispersed emulsion is adequate. The emulsion may be produced by known techniques, for example by shaking, beating, stirring, turbulent mixing, injection of one phase into the other, or vibration. The production of the emulsion can be facilitated by adding emulsifiers. The use of metal sulphates in weak sulphuric acid solutions can be advantageous, if the oils used for the production of the emulsion contain basic nitrogen compounds. These react with the sulphuric acid to form invert soaps, which act as excellent emulsifiers.

The oil component of the above emulsion is preferably a heavy fraction derived from the hydrogenation of coal and boiling in the range 260°–550° C. However, heavy fractions and residues derived from crude oil, heavy crude oil, tar sand oil, coal tar fractions and pitches are also suitable.

According to a still further feature of the invention, the carbonaceous material is suspended in the oil, the aqueous solution of the salt of the hydrogenating metal is emulsified with the oil, the emulsion is mixed with the suspension, and the salt is then converted to the sparingly soluble derivative.

The water contained in the system is then preferably removed by evaporation.

Suitable water-soluble metallic salts include those of iron, tin, molybdenum, cobalt, nickel, zinc, vanadium, tungsten, chromium and antimony. Preferably the sulphates are employed.

The combination of an iron salt and a salt of another hydrogenating metal, preferably tin, is particularly beneficial.

Catalysts which contain iron in combination with tin, molybdenum, nickel, cobalt or zinc provide a further advantage in the highly active sulphidic form. If they are used to hydrogenate a coal/oil slurry in which the slurry oil is a heavy distillate from a previous coal hydrogenation process, then the product contains a relatively high concentration of hydrogen donor substances. To achieve this level previously required a separate hydrogenation stage. It is known that a high proportion of hydrogen donor compounds has a beneficial effect on conversion, distillate yield and also product quality.

Tin containing catalysts are distinguished by high hydrogenating and cracking activity which results in the preferential formation of light products.

The catalysts can be used in the following quantities (calculated as metal content of the catalysts, based on the carbonaceous material or mixture of carbonaceous material and hydrocarbons for conversion):

|  | % by weight |  | % by weight |
| --- | --- | --- | --- |
| Iron | 0.5–5 | preferably | 1–3 |
| Tin | 0.01–1 | " | 0.05–0.1 |
| Molybdenum | 0.01–1 | " | 0.05–0.1 |
| Cobalt | 0.01–1 | " | 0.05–0.1 |
| Nickel | 0.1–2 | " | 0.1–0.5 |
| Zinc | 0.1–2 | " | 0.1–1 |
| Vanadium | 0.1–2 | " | 0.1–1 |
| Tungsten | 0.1–2 | " | 0.1–1 |
| Antimony | 0.05–2 | " | 0.1–1 |

The other metals are preferably used together with iron.

The addition of a calcium compound in finely divided form, preferably the nitrate, in small quantities, eg 0.1 to 0.5% by weight Ca, expressed as a percentage by weight of the carbonaceous material, may increase the activity of the catalyst. However, care should be exercised since the addition of calcium compounds, particularly in larger quantities, may give rise to problems with calcium carbonate deposition in subsequent processing equipment. The calcium compound may be added before, during or after the production of the mixture of the carbonaceous material and catalyst.

The invention is illustrated with reference to FIGS. 1 and 2 of the accompanying drawings wherein.

Figure 1:
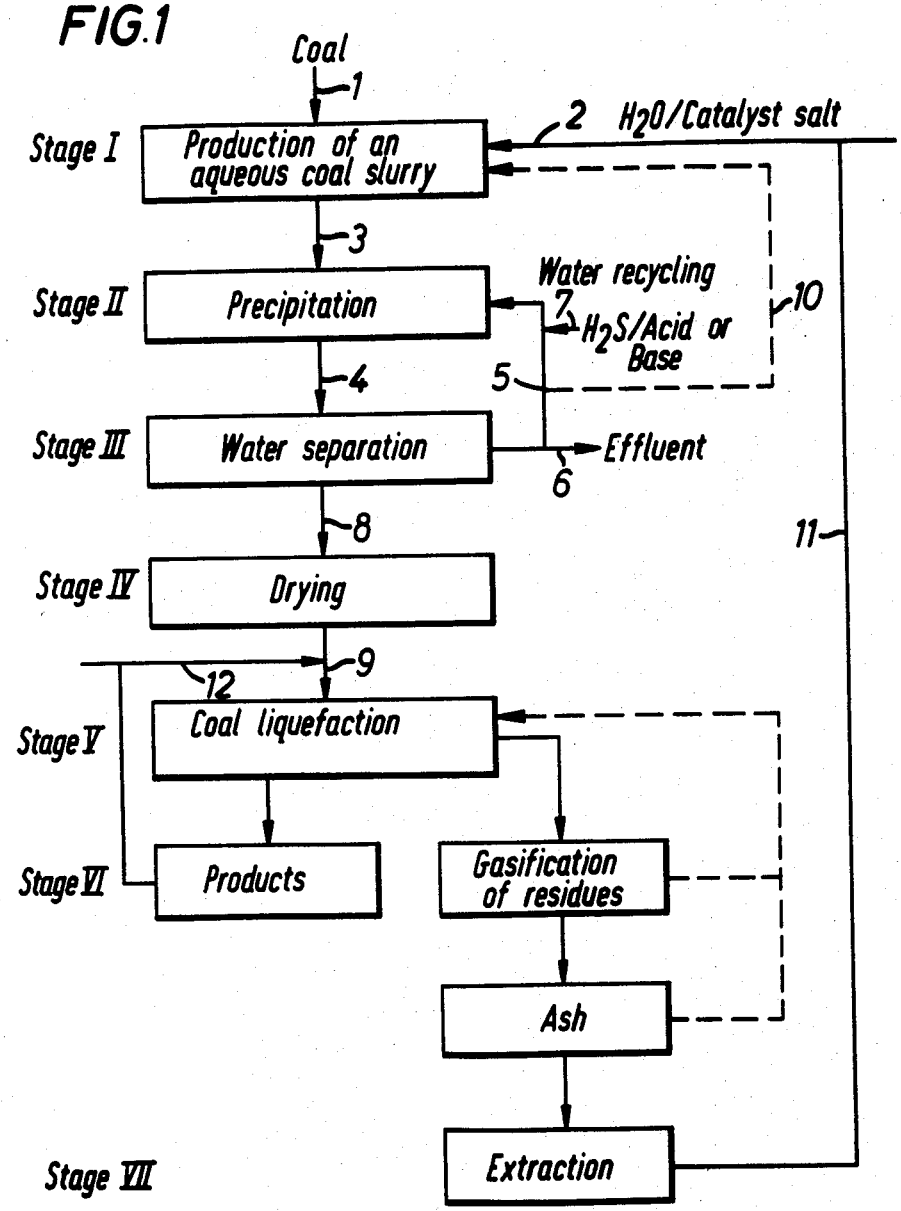
FIG. 1 illustrates a coal hydrogenation plant in which the catalyst is precipitated onto the coal from an aqueous suspension.

The process described in FIG. 1 has been designed to produce only slight quantities of effluent water. Coal in particulate form passes through pipe 1 and aqueous catalyst solution through pipe 2 into Stage I. In this stage an aqueous coal slurry with a high content of solids is produced.

The separation of the water is favoured by the hydrophobic character of the hard coals which are preferably used so that a simple separating process such as filtration or hydrocycloning is adequate. The remaining moisture, at most 20%, can be eliminated by conventional methods.

Stage I can be carried out in a manner similar to that of a wet grinding process in which long tubular ball mills are used, of cement industry practice.

The resulting coal slurry is pumped through pipe 3 into Stage II and is intimately mixed there with recycled water containing hydrogen sulphide. This results in the precipitation of the catalyst as the metal sulphide.

The aqueous suspension then passes through the pipe 4 into Stage III for the separation of the water, which takes place as described above. The aqueous effluent containing hydrogen sulphide is recycled via pipe 5 to Stage II. The hydrogen sulphide concentration of the recycle water is adjusted so that the catalyst concentration and hydrogen sulphide concentration in the effluent or in the pipe 10 is as low as possible. The pH of the recycle water is adjusted to optimise the precipitation conditions via pipe 7.

The separated coal then passes via pipe 8 into Stage IV to the coal drier.

The dried coal supporting the finely divided catalyst is fed via the pipe 9 to a liquid phase hydrogenation process (Stage V). When using expensive catalysts it may be advantageous to remove them by known methods from the ash resulting from the gasification of residues (Stage VII) and to recycle them via the pipe 11.

The slurry oil brought through pipe 12 for the production of the coal/oil slurry can consist wholly or partly of heavy product fractions from Stage VI.

Furthermore, it may be advantageous for reducing the quantity of aqueous effluent removed by pipe 6, to recycle to Stage I part of the water resulting from the water separation stage via pipe 10 prior to the addition of hydrogen sulphide, and to re-use it for the production of the aqueous coal slurry. This option is open if excess hydrogen sulphide is not used, or only to a slight extent.

In the coal hydrogenation plant described with reference to FIG. 2, ground the pre-dried coal is mixed in a tank 13 with slurry oil (coal liquefaction distillate, boiling range approximately 350°–550° C.). An emulsion of slurry oil and concentrated aqueous metal salt solution is produced in an emulsifier 14. This emulsion is added in the tank 15 to the slurry of coal and oil coming from tank 13, an emulsion with a low concentration of water being formed. The water content of the emulsion depends on the solubility of the metallic salt employed. Usually the concentration in the mixing tank 15 is about 2–20, especially 4–10% by weight (calculated on the dry weight of coal). Hydrogen sulphide is introduced into the mixer tank 15 via a pipe 16. An adjustment of the pH may be necessary. The emulsion/coal suspension is then heated in heat exchangers 17 and 18 or by blending with a hot product stream which is brought in via pipe 20 to such an extent that excess hydrogen sulphide, water and highly volatile components of the slurry oil are removed in the separator 19 under the process pressure (100–300 bar). Separation of these substances takes place in a separator 21.

The solids content in the mixer tank 15 is suitably at most 60% by weight, preferably 35–55% by weight, when coal is used. If heavy oils are used as slurry oils, lower solids contents should be used, depending on their nature.

The supply of a product fraction boiling approximately in the range from 260° to 400° C. through a pipe 20 makes it possible to adjust the quality of the slurry oil since the highest proportion of hydrogen donor components is contained in this fraction. As will be shown subsequently, catalysts produced according to the invention, in which iron is combined with tin, molybdenum, nickel, cobalt or zinc, provide the further advantage that during hydrogenation the concentration of hydrogen donor components is considerably increased.

The oil brought in via pipes 22 and/or 23 and also 24 or 25 for the production of the coal/oil suspension or catalyst solution/oil emulsion may consist wholly or partially of heavy product fractions from the hydrogenation of coal.

Figure 2:
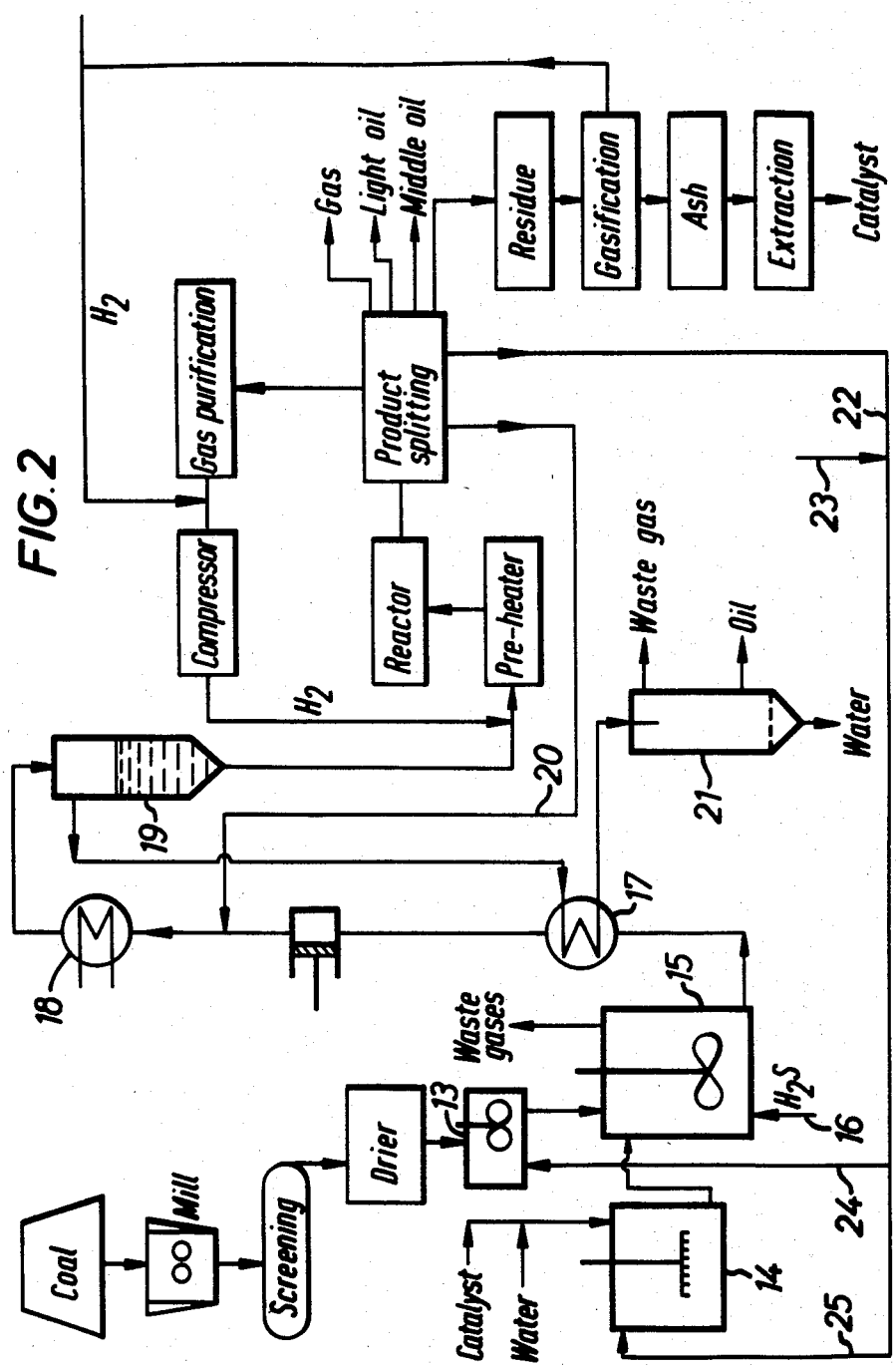
FIG. 2 illustrates a coal hydrogenation plant in which the catalyst is precipitated onto the coal form a water-in-oil emulsion.

The remainder of the process which utilises conventional coal hydrogenation technology is set out schematically in FIG. 2.

The invention is further illustrated with reference to the following Examples.

EXPERIMENTAL PROCEDURE

The carbonaceous material was a bituminous flame coal dried with nitrogen in a fluidised bed and then ground to a product with a maximum particle size of 0.2 mm, from which a fraction with a particle size in the range 0.125 to 0.04 mm was obtained by sieving.

The coal had the following properties:

| | |
|---|---|
| Water content | 10% |
| Ash | 10% |
| Iron | 1% |
| Sulphur | 1% |
| Chlorine | 0.4% |
| Nitrogen | 1.4% |
| Calcium | 0.4% |
| Carbon | 73% |
| Hydrogen | 5.3% |
| Particle size | 0.125–0.04 mm |
| Settled apparent density | approx. 0.5–0.6 g/ml |

Coal hydrogenating test runs were carried out in an autoclave for 1 hour at 450° C., 300 bar $H_2$ pressure and with a coal to oil ratio of 2:3. Anthracene oil with a boiling range of 260°–350° C. and a C/H atomic ratio of approximately 0.98 derived from the liquefaction of coal was used as the slurry oil.

The products were treated as follows:
Gas analysis
When the autoclave was opened the gas was trapped, a gas sample was taken and the content of $C_1$–$C_5$ hydrocarbons determined by gas chromatography.
Distillation
The product was homogenised and fractionated by distillation up to 100° C. at normal pressure and 100° C. under vacuum. Gaseous products obtained during the distillation are contained in the gas yield stated.
Conversion
A sample of the total product including remaining slurry oil was extracted in a Soxhlet apparatus for 20 hours with toluene. The insoluble fraction was weighed and the conversion was obtained by expressing the insoluble fraction as a percentage by weight of the quantity of coal used on a moisture and ash free basis, after taking the ash and catalyst content of the insoluble fraction into account.

Asphaltene content

The determination was carried out according to DIN 51 595, on the extract obtain from the Soxhlet apparatus.

Extract yield

That fraction of the product which was soluble in hot toluene but could not be distilled was considered to be the extract.

EXAMPLE 1

Experiments 1–3

Experiments 1 and 2 describe the preparation of catalysts according to the prior art and Experiment 3 according to the aqueous suspension method of the present invention.

Experiment 1

1 kg coal particles and 45.8 g $FeSO_4.7H_2O$ were ground for 6 hours in a ball mill running at a speed of 1.3 revs/second. The loading of the mill was about 50%.

Experiment 2

1 kg coal particles was mixed with a solution of 45.8 g $FeSO_4.7H_2O$ in 1.5 l water. The mixture was stirred for 2 hours. Subsequently the water was removed by evaporation in a vacuum oven.

Experiment 3

15.5 g coal was mixed with 40 ml water and 7.1 ml of a solution containing 100 g $FeSO_4.7H_2O/l$ and stirred for 15 minutes. 15 ml 0.1N NaOH was then added and approximately 40 ml $H_2S$ added in the gaseous form to precipitate ferrous sulphide on to the coal. The resulting mixture was subsequently filtered and dried.

The products from Experiments 1, 2 and 3 were then subjected to hydrogenation in an autoclave as previously described.

The results are given in the following Table.

TABLE 1

| Experiment No. | Catalyst | Conversion % | Gas yield % | Distillate yield % | Asphaltene yield % |
|---|---|---|---|---|---|
| 1 | % Fe (ground in ball mill) | 78.0 | 15.5 | 24.1 | 23.8 |
| 2 | 1% Fe (impregnated) | 83.2 | 17.0 | 26.7 | 19.3 |
| 3 | 1% Fe (invention)[1] | 83.4 | 16.2 | 34.5 | 22.0 |

[1]Coal/water suspension; iron precipitated as sulphide.

All the percentages in Table 1 given for yield and conversion relate to the quantity of coal used (moisture and ash free).

Experiments Nos. 1 and 2 illustrate the prior art and Experiment 3 the invention. With coal/catalyst mixtures produced according to the invention, a higher yield of distillate is obtained. This shows that ferrous sulphide precipitated according to the invention is more active than ferrous sulphate applied according to the impregnation process and converted to ferrous sulphide under coal hydrogenation conditions.

Experiment 4

25 g $FeSO_4.7H_2O$ and 0.95 g $SnCl_2.2H_2O$ were dissolved in 700 ml water. 500 g coal was added in small increments with vigorous stirring. After the addition had been completed the resulting suspension was stirred for 30 minutes with increased intensity. Concentrated ammonia solution was then added to adjust the pH to 9. Immediately afterwards $H_2S$ was bubbled through for 35 minutes with stirring. The resulting slurry was then filtered and the residue dried at 125° C. It contained 1% by weight Fe and 0.1% Sn.

Experiments 5–7

Coal catalyst mixtures were obtained in a similar manner from $FeSO_4.7H_2O$ and salt of other metals in quantities calculated to give the concentrations shown in Table 2:

| Experiment No. | Other Metal Salt |
|---|---|
| 5 | $CoSO_4.7H_2O$ |
| 6 | $NiSO_4.7H_2O$ |
| 7 | $Zn(CH_3.COO)_2.2H_2O$ |

In Experiment 7, the pH was adjusted to 7 before the addition of $H_2S$.

Experiment 8 is a further comparative example and is not according to the invention. In this experiment, ferrous sulphate was added to the Bayermasse by the impregnation method according to the prior art.

The products from Experiments 4–8 were then subjected to hydrogenation in an autoclave as previously described. The results are set out in the following Table 2.

The combinations of tin, cobalt, nickel and zinc with iron show surprising advantages, especially in regard to the yield in the second fraction, as compared with the IG Farben catalyst according to Example 8.

TABLE 2

| Experiment No. | Catalyst | Gas $C_1-C_4$ % | 1st fraction $C_5$-170° C. % | 2nd fraction 170–260° C. % | 3rd fraction 260–550° C. % | Sum of 1st to 3rd fraction $C_5$-550° C. % | Extract % | Conversion % |
|---|---|---|---|---|---|---|---|---|
| 4 | Fe 1% Sn 0.1% | 17 | 14.8 | 45.0 | −5 | 54.8 | 20 | 96 |
| 5 | Fe 1% Co 0.1% | 15.1 | 12.2 | 18.1 | 18.2 | 48.5 | 26.9 | 93 |
| 6 | Fe 1% Ni 0.5% | 14.2 | 8.0 | 12.5 | 36.1 | 51.6 | 21.6 | 98 |
| 7 | Fe 1% Zn 0.5% | 9.9 | 13.6 | 35.4 | −15.1 | 33.9 | 16.2 | 95 |
| 8 | Fe 1% Bayermasse 2% $Na_2S$ 0.3% | 17.5 | 9.0 | 4.1 | 38.0 | 51.1 | 22.3 | 98 |

All percentages given for yield and conversion relate to the quantity of coal used (moisture and ash free). The figures which in some cases are negative for the third distillate fraction are explained by the fact that part of the slurry oil is converted and the quantity of slurry oil initially used is deducted from the quantity of the third distillate fraction obtained.

From Table 3 can be seen the improvement in the slurry oil in respect of hydrogen donor compounds by using two catalysts produced according to the invention.

The data given for the intensity are proportional to the concentration of the compounds listed.

Experiment 12

25 g $FeSO_4.7H_2O$ and 0.92 g $(NH_4)_6MO_7O_{24}.4H_2O$ were dissolved in 40 ml water. The resulting solution was emulsified with 84 g anthracene oil by agitation with a turbostirrer.

The emulsion was immediately added with stirring to a slurry containing 500 g coal dispersed in 667 g anthracene oil. Stirring was continued while $H_2S$ was bubbled through for 30 minutes.

Water was then removed by carefully heating the mixture to 120° C. and directing a stream of nitrogen on to the surface of the mixture. In Experiment 10, the water was not removed completely.

TABLE 3

| | $M = 178$ $Z = -18$ | $M = 180$ $Z = -16$ | $M = 182$ $Z = -14$ | $M = 186$ $Z = -10$ |
|---|---|---|---|---|
| | INTENSITY | INTENSITY | INTENSITY | INTENSITY |
| Slurry oil | 11.3 | 9.0 | 5.9 | 2.4 |
| Expt. No. 4 | 6.4 | 6.5 | 8.3 | 3.6 |
| Expt. No. 6 | 6.0 | 5.8 | 6.6 | 2.6 |

M is the molecular weight and Z factor is a measure of aromaticity.

In Table 3 the slurry oil used for the experiments was compared with fractions derived from the third distillate fraction and having the corresponding boiling range of 260°–350° C.

The products from Experiments 9–12 were then subjected to hydrogenation in an autoclave as previously described.

The results obtained are set out in the following Table 4.

TABLE 4

| Experiment No. | Catalyst | Gas $C_1-C_4$ % | 1st fraction $C_5$-170° C. % | 2nd fraction 170-260° C. % | 3rd fraction 260-550° C. % | Sum of 1st to 3rd fraction $C_5$-550° C. % | Extract % | Conversion % |
|---|---|---|---|---|---|---|---|---|
| 9 | Fe 1% Sn 0.1% | 12.9 | 12.6 | 66.0 | −23.5 | 55.1 | 20.8 | 94 |
| 10 | Fe 1% Sn 0.1% | 15.9 | 8.9 | 24.7 | 5.7 | 39.3 | 26.2 | 90 |
| 11 | Fe 1% | 12.7 | 7.3 | 53.3 | −19.2 | 41.4 | 28 | 85 |
| 12 | Fe 1% Mo 0.1% | 14.3 | 9.3 | 37.4 | 12.2 | 58.9 | 18.2 | 98 |

All percentages given for yield and conversion relate to the quantity of coal used (moisture and ash free). The figures which in some cases are negative for the third distillate fraction are explained by the fact that part of the slurry oil is converted and the quantity of slurry oil initially used is deducted from the quantity of the third distillate fraction obtained.

EXAMPLE 2

In this Example results are recorded for catalysts produced by the emulsion precipitation process according to the invention.

Experiment 9–12

Details of the method for preparing the catalysts are given for Example 12 using $FeSO_4.7H_2O$ and $(NH_4)_6Mo_4O_{24}.4H_2O$.

Coal catalyst mixtures were obtained in a similar manner from $FeSO_4.7H_2O$ and salts of other metals in quantities calculated to give the concentrations shown in Table 4.

| Experiment No. | Other Metal Salts |
|---|---|
| 9 | $SnCl_2.2H_2O$ |
| 10 | $SnCl_2.2H_2O$ |
| 11 | — |

It will be seen from Table 4 that catalysts containing iron and another metal produced according to the invention are particularly effective.

Experiments 9 and 11 show that the activity of the somewhat less active iron is increased by the addition of another metal; the conversion figures and product figures in the $C_5$-550° C. range in Experiment 9 are about 10% and 30% higher than the corresponding figures for Experiment 11. Experiments 9 and 10 differ from one another by the water content in the reaction mixture. The reaction mixture in Experiment 9 contains 0.4% by weight, the reaction mixture in Experiment 10, 13% by weight of water. The results clearly demonstrate the harmful influence of water on the hydrogenation of coal.

We claim:

1. A process for the preparation of a catalyst suitable for hydrogenation of coal and/or heavy oil fractions by bringing a water-in-oil emulsion containing a salt of hydrogenating metal into contact with a carbonaceous solid followed by removal of water characterized in that the salt is converted into a hydroxide or sulphide while the water-in-oil emulsion is in contact with the carbonaceous material.

2. A process according to claim 1 wherein the carbonaceous material is a hard coal.

3. A process according to claim 1 wherein the salt is converted to a hydroxide by treatment with an alkali.

4. A process according to claim 1 wherein the salt is converted to a sulphide by the reaction of an alkali and hydrogen sulphide.

5. A process according to claim 1 wherein the carbonaceous material is suspended in oil, the emulsion is mixed with the suspension, and the salt is then converted to the hydroxide or sulphide.

6. A process according to claim 1 wherein the hydrogenating metal is selected from one or more of the following metals: iron, tin, molybdenum, cobalt, nickel, zinc, vanadium, tungsten, chromium and antimony.

7. A process according to claim 6 wherein at least two hydrogenating metals are used, one of which is iron.

8. A process according to claim 7 wherein the hydrogenating metals are iron and tin.

9. A process according to claim 1 wherein a compound of calcium is added before, during or after the impregnation of the carbonaceous material to give a calcium concentration of 0.1 to 0.5% by weight, based on the carbonaceous material.

10. A process according to claim 1 wherein the mixture of the carbonaceous material and the hydrogenation catalyst is subsequently ground.

* * * * *